(12) United States Patent
Moon et al.

(10) Patent No.: US 8,233,111 B2
(45) Date of Patent: Jul. 31, 2012

(54) LIQUID CRYSTAL DISPLAY DEVICE

(75) Inventors: Kwan Sik Moon, Paju-si (KR); Jung Honk Park, Daegu (KR)

(73) Assignee: LG Display Co., Ltd., Seoul (KR)

( * ) Notice: Subject to any disclaimer, the term of this patent is extended or adjusted under 35 U.S.C. 154(b) by 453 days.

(21) Appl. No.: 12/613,047

(22) Filed: Nov. 5, 2009

(65) Prior Publication Data
US 2010/0157201 A1 Jun. 24, 2010

(30) Foreign Application Priority Data

Dec. 19, 2008 (KR) .................. 10-2008-0130283
Sep. 23, 2009 (KR) .................. 10-2009-0090202

(51) Int. Cl.
*G02F 1/13357* (2006.01)
*G09F 13/04* (2006.01)

(52) U.S. Cl. ............. 349/61; 349/67; 349/70; 362/97.2

(58) Field of Classification Search ............ 349/58, 349/60, 61, 67, 70; 362/97.1, 97.2, 217.05, 362/217.09, 225, 296.01, 306, 390
See application file for complete search history.

(56) References Cited

U.S. PATENT DOCUMENTS

| | | | |
|---|---|---|---|
| 7,740,372 B2 * | 6/2010 | Sohn | 362/225 |
| 7,744,240 B2 * | 6/2010 | Kim et al. | 362/225 |
| 8,016,447 B2 * | 9/2011 | Lee et al. | 362/97.2 |
| 2010/0214492 A1 * | 8/2010 | Kuromizu | 348/725 |

* cited by examiner

*Primary Examiner* — Dung Nguyen
*Assistant Examiner* — Tai Duong
(74) *Attorney, Agent, or Firm* — Brinks Hofer Gilson & Lione

(57) ABSTRACT

An LCD device is disclosed. The LCD device is configured to include a plurality of insulation films between a balancely printed circuit board and a bottom cover and to form a plurality of air layers between the plurality of insulation films. Accordingly, noise caused by vibrations from electric currents flowing through lamps can be minimized.

12 Claims, 4 Drawing Sheets

- 124a, 124b
- 228a, 228b
- 232
- air layer

|  | VBr-b | 1st | 2nd | 3rd | 4th | 5th |
|---|---|---|---|---|---|---|
| RELATED ART | 0V(30%) | 23.0 | 22.7 | 22.8 | 23.1 | 23.0 |
|  | 0.82V(50%) | 19.3 | 19.1 | 19.2 | 19.3 | 19.0 |
|  | 1.65V(70%) | 19.4 | 19.6 | 20.6 | 20.7 | 20.7 |
|  | 2.47V(90%) | 21.0 | 21.1 | 21.1 | 20.7 | 20.7 |
|  | 3.3V(100%) | 14.5 |  |  |  |  |
| FIRST EMBODIMENT | 0V(30%) | 18.1 | 18.2 | 18.3 | 18.2 | 18.2 |
|  | 0.82V(50%) | 18.0 | 18.4 | 18.4 | 18.7 | 18.1 |
|  | 1.65V(70%) | 18.5 | 18.5 | 18.5 | 18.4 | 18.8 |
|  | 2.47V(90%) | 19.4 | 19.4 | 19.4 | 19.4 | 19.6 |
|  | 3.3V(100%) | 14.5 |  |  |  |  |
| SECOND EMBODIMENT | 0V(30%) | 17.8 | 17.7 | 17.4 | 17.2 | 17.1 |
|  | 0.82V(50%) | 18.1 | 17.9 | 17.9 | 17.8 | 17.9 |
|  | 1.65V(70%) | 17.0 | 17.0 | 16.9 | 16.9 | 17.1 |
|  | 2.47V(90%) | 18.5 | 18.4 | 18.4 | 18.5 | 18.2 |
|  | 3.3V(100%) | 14.4 |  |  |  |  |

LIQUID CRYSTAL DISPLAY DEVICE

This application claims the benefit of Korea Patent Application Nos. 10-2008-0130283 and 10-2009-0090202, filed on Dec. 19, 2009, the entire contents of which is incorporated herein by reference for all purposes as if fully set forth herein.

BACKGROUND

1. Field of the Invention

This disclosure relates to a liquid crystal display device and more particularly to a liquid crystal display device adapted to minimize noise which is caused by vibrations from electric currents flowing through lamps.

2. Discussion of the Related Art

As the information age progresses, display devices visually displaying a large amount of data on the basis of an electric signal are being rapidly developed. As a result, flat panel display devices with superior features such as light weight, slimness, and low electric power consumption have been widely distributed. Flat panel display devices include liquid crystal display (LCD) devices, plasma display panel (PDP) devices, field emission display (FED) devices, electro luminescence display (ELD) devices, and so on. These cathode ray tubes of related art are rapidly being replaced with flat display devices In order to form an image (or picture), LCD devices receive the light necessary to form an image (or picture) because they cannot emit their own light. In other words, LCD devices are light receiving type devices. Accordingly, LCD devices have to include a separate light source, for example, a backlight unit. The backlight unit used in LCD devices is classified as a direct type or an edge type according to the placement of (a) fluorescent lamp(s). A direct type backlight unit includes a plurality of fluorescent lamps arranged on a plane under a liquid crystal panel, while an edge type backlight unit includes a fluorescent lamp disposed on one side portion of the light guide plate.

More specifically, an edge type backlight unit includes a light guide plate guiding light as well as a lamp portion disposed on one side surface of the light guide plate. The lamp portion includes a light emitting lamp, lamp holders installed to receive and protect both ends of the lamp, and a reflective plate encompassing the outer circumference surface of the lamp. One side surface of the reflective plate is inserted into one side surface of the light guide plate. The reflective plate reflects light emitted from the lamp toward the light guide plate. Such an edge type backlight unit is mainly used in LCD devices of relatively small sizes which are applied to the monitors of laptop and desktop computers. The edge type backlight unit has a uniform light distribution and a long life span of internal parts, and allows the LCD device to be thinner.

The development of direct type backlight units began with the enlargement of LCD devices. The direct type backlight unit includes a plurality of lamps arranged under a diffusion plate in order to directly irradiate light on the entire surface of a liquid crystal panel. As such, the direct type backlight unit has a higher light efficiency than that of the edge type backlight unit. In view of this point, the direct type backlight unit is mainly used in large-sized LCD devices requiring a high level of brightness. Meanwhile, the direct type backlight unit includes many lamps. A large-sized monitor or television including an LCD device with a direct type backlight unit has a longer life span than a laptop computer. Due to these reasons, a direct type backlight unit may be more often out of order than an edge type backlight unit, and there is a high possibility that part of the lamps will not function due to the end of their life span.

Actually, a direct type backlight unit applied to an LCD device includes a plurality of fluorescent lamps arranged in an inner space (or cavity) formed by upper and lower frames, a reflective plate disposed under the plurality of fluorescent lamps and configured to reflect light, and optical sheets disposed over the plurality of fluorescent lamps and configured to diffuse and converge light from the plurality of fluorescent lamps. The plurality of fluorescent lamps is inserted into fixing members on a balancely printed circuit board (B-PCB) and is placed into a bottom cover. The B-PCB and the bottom cover are insulated from each other by an insulation layer formed between them.

When the plurality of fluorescent lamps generate light using electric currents each corresponding to lamp drive voltages, vibrations are caused by the electric currents flowing through the fluorescent lamps. The vibrations are transferred to the B-PCB. The transferred vibrations reach the bottom cover in such a manner that they are reduced to a very slight degree by the insulation layer.

However, the insulation layer decreases in thickness as the LCD device is gradually made thinner. As such, the distance between the B-PCB and the bottom cover is reduced. In addition, the distance between the plurality of fluorescent lamps and the B-PCB is reduced. Due to these reasons, the vibrations caused by the electric currents flowing through the plurality of fluorescent lamps largely increase in comparison with those of the related art. Accordingly, noise may be generated on the entire surface of the bottom cover.

BRIEF SUMMARY

Accordingly, the present embodiments are directed to an LCD device that substantially obviates one or more of problems due to the limitations and disadvantages of the related art.

An object of the present embodiment is to provide an LCD device that includes a plurality of insulation layers formed between B-PCB and the bottom cover and air layers formed between the B-PCB, the plurality of insulation layers, and the bottom cover, thereby minimizing noise which is caused by vibrations from electric currents flowing via a plurality of fluorescent lamps.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, an LCD device includes: a liquid crystal panel; a backlight unit configured to include a plurality of lamps arranged on a rear surface of the liquid crystal panel and a plurality of optical sheets which are configured to apply lights emitted from the plurality of lamps to the liquid crystal panel; a bottom cover configured to receive the liquid crystal panel and the backlight unit; first and second balance printed circuit boards each disposed at the left and right edges of the inner side of the bottom cover and each configured to include lamp sockets receiving both ends of the plurality of lamps; a first insulation film; a second insulation film disposed between the bottom cover and the first and second balance printed circuit boards, the first insulation film disposed between the first and second balance printed circuit boards and the second insulation film, wherein at least two air layers are formed between the balance printed circuit boards and the second insulation film.

An LCD device according to another aspect of the present embodiment includes: a liquid crystal panel; a backlight unit configured to include a plurality of lamps arranged on a rear surface of the liquid crystal panel and a plurality of optical sheets which are configured to apply lights emitted from the plurality of lamps to the liquid crystal panel; a bottom cover configured to receive the liquid crystal panel and the backlight unit; first and second balance printed circuit boards each disposed at the left and right edges of the inner side of the bottom cover and each configured to include lamp sockets receiving both ends of the plurality of lamps; a reflective plate of a soundproof material disposed on the inner side of the bottom cover and configured to reflect lights emitted from the plurality of lamps to the optical sheets; and an insulation film disposed between the bottom cover and the first and second balance printed circuit boards and formed opposite to the first and second balance printed circuit boards, wherein at least two first air layers are formed between the first and second balance printed circuit boards and the reflective plate.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION OF THE DRAWINGS AND THE PRESENTLY PREFERRED EMBODIMENTS

Figure 1:
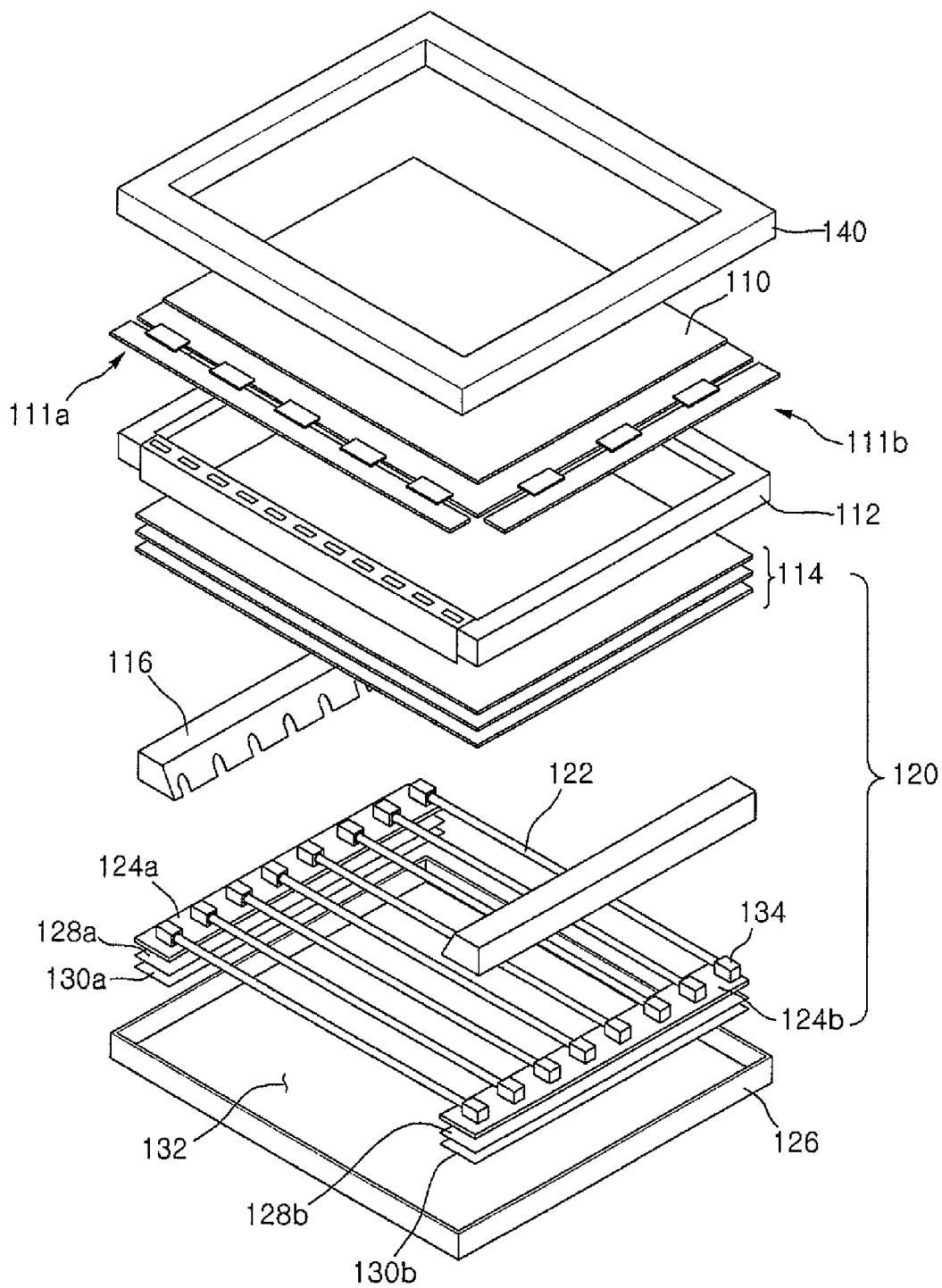
FIG. 1 is an exploded perspective view of an LCD device according to a first embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

FIG. 1 is an exploded perspective view of an LCD device according to a first embodiment of the present disclosure. Referring to FIG. 1, an LCD device according to a first embodiment of the present disclosure includes a liquid crystal panel 110 and first and second printed circuit boards (PCBs) 111a and 111b. The liquid crystal panel 110 includes upper and lower substrates with a liquid crystal layer between them. On the upper and lower substrates, electrodes for generating an electric field are formed opposite to each other. The first and second PCB 111a and 111b are connected to the liquid crystal panel 110 and apply scan signals and data signals to gate lines and data lines formed on the lower substrate. The first PCB(111a), on which a gate driver for supplying a scan signal to the gate lines is mounted. The second PCB(111b), on which a data driver for supplying a data to the data lines is mounted.

The LCD device further includes a backlight unit 120 which is disposed on the rear surface of the liquid crystal panel 110 and applies light to the liquid crystal panel 110. The backlight unit 120 is of a direct type. As such, the backlight unit 120 includes a plurality of lamps 122 and a plurality of optical sheets 114. The lamps 122 are arranged parallel to one another at a fixed interval. The optical sheets 114 are stacked over the lamps 114 and diffuse lights emitted from the lamps 122, thereby improving the viewing angle.

Such an LCD device may be modulated into a guide panel 112, a bottom cover 126, a top case 140, and a plurality of combining members (not shown). The guide panel 112 has a rectangular rim shape surrounding the edges of the liquid crystal panel 110 and the backlight unit 120. The bottom cover 126 supports the side and rear surfaces of the backlight unit 120. The top case 140 is formed in a shape of a rectangular rim which surrounds the edge of the front (or upper) surface of the liquid crystal panel 110 and is combined with the guide panel 112. The plurality of the combining members combines the guide panel 112, the bottom cover 126, and the top case 140.

To explain the combined configuration of the lamps 122 in the backlight unit 120, one end of the plural lamps 122 are fastened to a first Balance Printed Circuit Board (B-PCB) 124a and the other end of the plural lamps 122 are fastened to a second Balance Printed Circuit Board (B-PCB) 124b. Each of the first and second B-PCBs 124a and 124b is covered with a support sider 116. The support siders 116 are combined with both side edges of the bottom cover 126 supporting the rear as well as the side surfaces of the backlight unit 120, respectively. A reflective plate 132 is disposed on the inside of the bottom cover. The reflective plate 132 reflects lights emitted from the plurality of lamps 122 and applies the reflected lights to the plurality of optical sheets 114. Also, a third PCB (not shown) is disposed on the rear surface of the bottom cover 126. The third PCB is configured to include an inverter (not shown) applying a lamp drive voltage(s) to the plurality of lamps 122.

Each of the first and second B-PCBs 124a and 124b includes lamp sockets 134. The lamp sockets 134 are arranged in a row along the lengthwise direction of each of the first and second B-PCBs 124a and 124b and are fastened to the first and second B-PCBs 124a and 124b by soldering. Both ends of each lamp 122 are inserted into the sockets 134.

First and second insulation films 128 and 130 are provided opposite to the first and second B-PCBs 124a and 124b disposed on the left/right side edges of the bottom cover 126. The first and second insulation films 128 and 130 are stacked between the bottom cover 126 and the first and second B-PCBs 124a and 124b and form a stacked layer. In other words, the first insulation film 128 is positioned between the first and second B-PCBs 124a and 124b and the second insulation film 130, and the second insulation film 130 is positioned between the first insulation film 128 and the bottom cover 126. Also, the first and second insulation films 128 and 130 are formed from a material containing poly ethylene terephthalate (PET) or poly carbonate (PC).

More specifically, the first insulation film 128 includes a first left insulation film 128a and a first right insulation film 128b, and the second insulation film 130 includes a second left insulation film 130a and a second right insulation film 130b. The first left insulation film 128a is positioned between the first B-PCB 124a and the second left insulation film 130a, and the first right insulation film 128b is positioned between the second B-PCB 124b and the second right insulation film 130b. The second left insulation film 130a is positioned between the first left insulation film 128a and the bottom cover 126, and the second right insulation film 130b is positioned between the first right insulation film 128b and the bottom cover 126.

Figure 2:
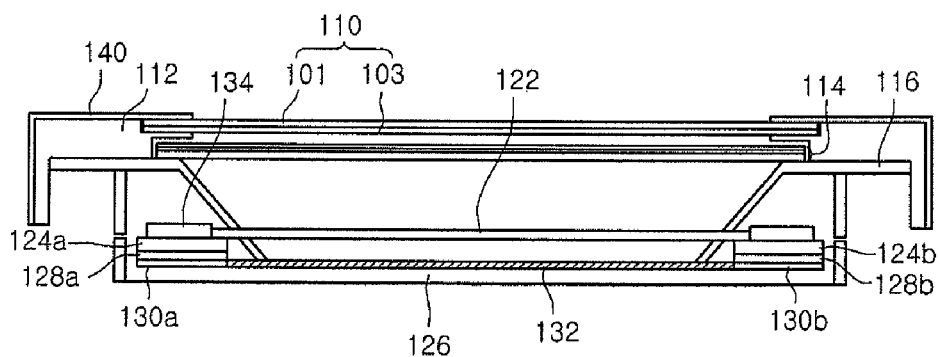
FIG. 2 is a cross-sectional view showing a modulated state of the LCD device of FIG. 1.
Figure 3:
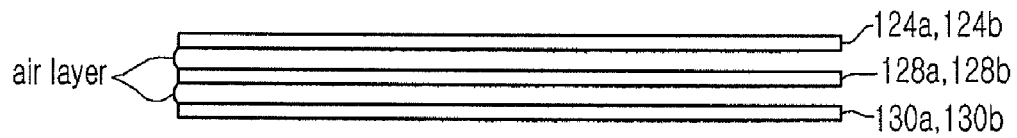
FIG. 3 is a cross-sectional view showing a state in which the first B-PCB and the first and second insulation films in FIG. 2 are sequentially stacked.

FIG. 2 is a cross-sectional view showing a modulated state of the LCD device of FIG. 1, and FIG. 3 is a cross-sectional view showing a state in which the first B-PCB and the first and second insulation films in FIG. 2 are sequentially stacked. As shown in FIGS. 1 through 3, the bottom cover 126 receives the backlight unit (120 in FIG. 1) and the liquid crystal panel 110 including the combined upper and lower substrates 101 and 103. The gate lines and data lines on the lower substrate 103 of the liquid crystal panel 110 cross each other and define pixel regions. Thin film transistors TFT (not shown) are formed in the pixel regions, respectively. Color filters opposite to the pixel regions are sequentially and repeatedly formed on the upper substrate 101. Polarizing plates (not shown) are attached to the outer surfaces of the upper and lower substrates 101 and 103.

The reflective plate 132 is attached to the inner surface of the bottom cover 126, and the first and second B-PCBs 124a and 124b are disposed at the left and right side edges of the bottom cover 126. The first and second left insulation films 128a and 130a are formed between the bottom cover 126 and the first B-PCB 124a. Similarly, the first and second right insulation films 128b and 130b are formed between the bottom cover 126 and the second B-PCB 124b. The total thickness of the first and second insulation films 128 and 130 are equal to that of the insulation film between the bottom cover and the B-PCB in the related art LCD device.

Consequently, the second insulation film 130 is positioned on the bottom cover 126, the first insulation film 128 is positioned on the second insulation film 130, and the first and second B-PCBs 124a and 124b are positioned on the first insulation film 128. As such, air layers, i.e. first air layer, are provided between the first and second B-PCBs 124a and 124b and the first insulation film 128, between the first and second insulation films 128 and 130, and between the second insulation film 130 and the bottom cover 126. In other words, at least two air layers are formed between the first B-PCB 124a and the bottom cover 126, as well as at least two air layers are formed between the second B-PCB 124b and the bottom cover 126.

When vibrations are generated by electric currents flowing though the lamps 122 on the first and second B-PCBs 124a and 124b and are transferred to the first and second B-PCBs 124a and 124b, the air layers absorb part of the vibrations transferred to the first and second B-PCBs 124a and 124b. Accordingly, the vibrations which reach the bottom cover 126 is greatly reduced.

In other words, the at least two insulation films 128 and 130 disposed between the B-PCBs 124 and the bottom cover 126 enable at least two air layers to be formed, so that such air layers partially between the insulation films 128 and 130 absorb the vibrations which are transferred from the lamps 122 to the bottom cover 126 via the B-PCBs 124 and the first and second insulation films 128 and 130. As such, the vibrations transferred from the lamps 122 to the bottom cover 126 greatly decrease.

In this manner, the LCD device according to a first embodiment of the present disclosure includes at least two insulation films 128 and 130 formed between the B-PCBs 124 and the bottom cover 126 and allows at least two air layers to be provided. Such air layers absorb the vibrations generated in the lamps 122. Accordingly, the vibrations transferred to the bottom cover 126 greatly decrease.

The first and second insulation films 128 and 130 may be formed from any one of a number of soundproof (or foamy) materials such as polyurethane foam, poron, and PSR, thereby absorbing the vibrations caused by the electric current (or tube currents) flowing through the lamps. As such, the amplitudes of the vibrations caused by the electric current (or tube currents) flowing through the lamps 122 are greatly reduced.

Figure 4A:
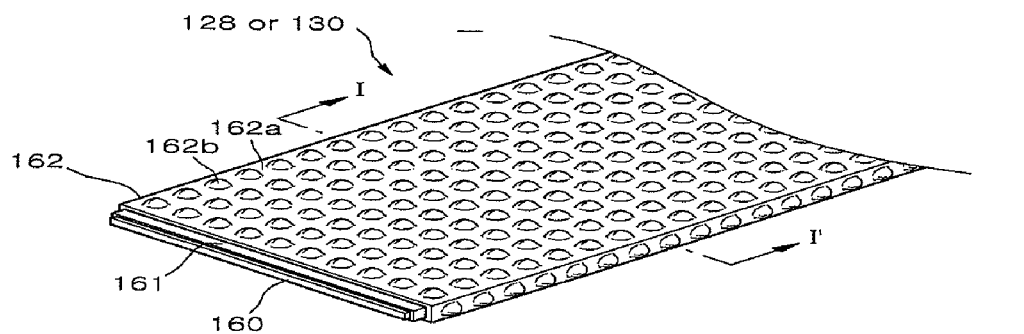
FIG. 4A is a view showing in detail the first and second insulation film shown in FIG. 3
Figure 4B:
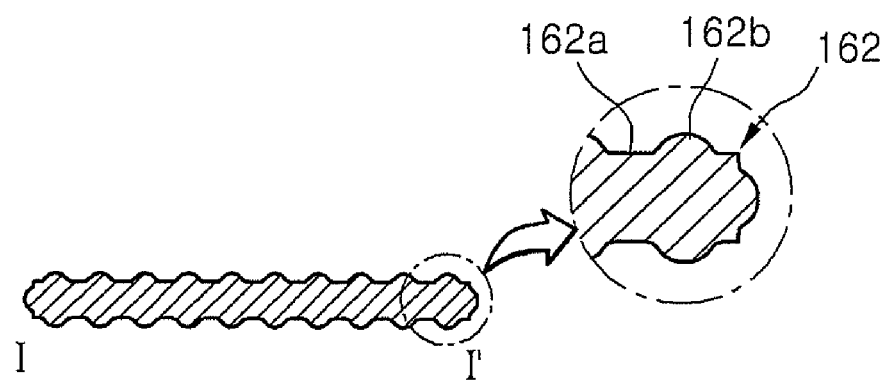
FIG. 4B is a cross-sectional view taken along I~I' of FIG. 4A

As shown in FIGS. 4A and 4B, the first and second insulation films 128 and 130 may be configured to further include a nonflammable, nonconductive fabric 162 which has a safety standard degree of V0 and encompasses the soundproof (foamy) material 160, because the soundproof (or foamy) material 160 such as polyurethane foam, poron, or PSR burns easily. The nonconductive fabric may be bonded to the soundproof material by an adhesive 161.

The nonconductive fabric 162 can be coated with a resin layer 162a as needed. The resin layer 162a may be formed through a PU coating process of coating a molten resin material on the nonconductive fabric 162, transcribing a variety of embossed patterns 162b on the coated resin material using a roller with the embossed pattern, and drying and hardening the coated region material. The nonconductive fabric coated with the resin layer through the PU coating process becomes stiffer, thereby improving more of its processing and handling properties.

Such first and second insulation films 128 and 130 configured to include the soundproof (or foamy) material encompassed with the nonconductive fabric have high dielectric strength and absorb the vibrations caused by the electric current (or tube current) flowing through the plurality of lamps 122, as well as protect elements from external impacts.

Figure 5:
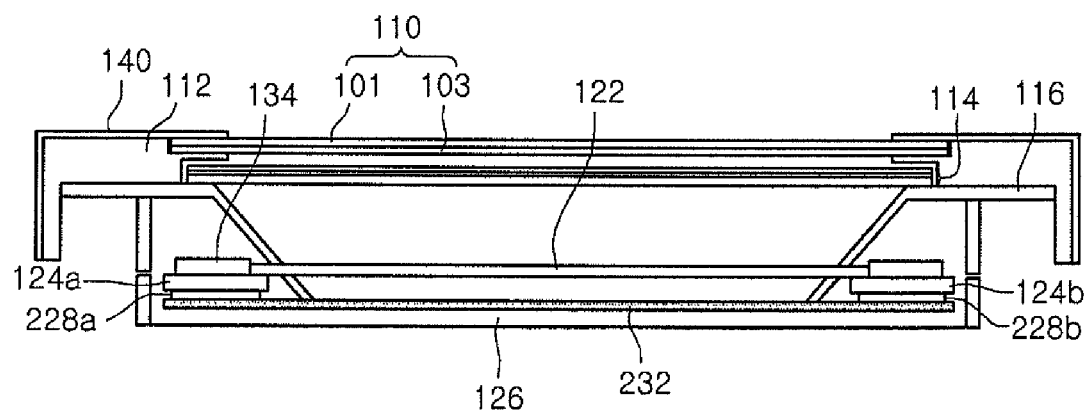
FIG. 5 is a cross-sectional view showing an LCD device according to a second embodiment of the present disclosure.
Figures 6, 7:
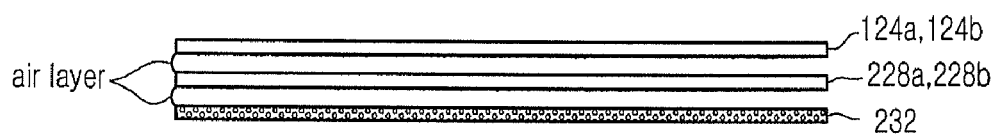
FIG. 6 is a cross-sectional view showing a state in which the first B-PCB, the insulation film, and the reflective plate in FIG. 5 are sequentially stacked.
FIG. 7 is a data sheet measuring vibrations generated in LCD devices according to the embodiments of the present disclosure and the related art.

FIG. 5 is a cross-sectional view showing an LCD device according to a second embodiment of the present disclosure. FIG. 6 is a cross-sectional view showing the state in which the first B-PCB, the insulation film, and the reflective plate in FIG. 5 are sequentially stacked. The LCD device according to a second embodiment of the present disclosure has the same basic configuration as the LCD device of the first embodiment described above. As such, the basic configuration of the LCD device according to a second embodiment of the present disclosure will be omitted.

As shown in FIG. 5, the LCD device according to a second embodiment of the present disclosure includes a reflective plate 232 of a soundproof (or foamy) material disposed at the inner surface of a bottom cover 126, and first and second B-PCBs 124a and 124b each disposed at the left and right edges of the reflective plate 232. The reflective plate 232 of the soundproof (or foamy) material can be formed from UXZ1. The reflective plate 232 is used for effectively scattering light on the inner side of the LCD device, but it may be formed through a foaming process. As such, the reflective plate 232 can additionally perform a sound absorbing function.

The LCD device further includes a left insulation film 228a of a soundproof (or foamy) material disposed between the first B-PCB 124a and the reflective plate 232, and a right insulation film 228b of a soundproof (or foamy) material disposed between the second B-PCB 124b and the reflective plate 232. The insulation film 228 (i.e., the left and right insulation films 228a and 228b) may be formed from any one of poly ethylene terephthalate (PET) and poly carbonate (PC). Alternatively, the insulation film 228 can be formed from a soundproof (or foamy) material such as polyurethane foam, poron, or PSR, as described above. In this case, the insulation film 228 may be encompassed with a nonflammable, nonconductive fabric having a safety standard degree of V0 because the soundproof (or foamy) material such as polyurethane foam, poron, or PSR burns easily. The nonconductive fabric may be bonded to the soundproof material by an adhesive. Such an insulation film 228 configured to include the soundproof (or foamy) material encompassed with the nonconductive fabric has a high dielectric strength and absorbs the vibrations caused by the electric current (or tube current) flowing through the plurality of lamps 122, as well as protects elements from external impacts.

In other words, the reflective plate 232 of the soundproof (or foamy) material is disposed on the inner surface of the bottom cover 126, the insulation film 228 (i.e., the left and right insulation films 228a and 228b) is formed on the reflective plate, and the first and second B-PCBs 124a and 124b are disposed on the insulation film 228 (more specifically, the left and right insulation films 228a and 228b). The stacked structure allows an air layer to be formed between the first and second B-PCBs 124a and 124b and the insulation film 228 (i.e., the left and right insulation films 228a and 228b), as well as another air layer to be formed between the insulation film 228 and the reflective plate 232 of the soundproof (foamy) material, as shown in FIG. 6. In addition, still another air layer may be formed between the reflective plate 232 of the soundproof (foamy) material and the bottom cover 126.

The structure of several layers disposed between the B-PCBs 124a and 124b and the bottom cover 126 creates the air layers between the B-PCBs 124a and 124b and the bottom cover 126, so that the air layers absorb part of the vibrations caused by electric currents flowing through the lamps 122. As such, the vibrations transferred to the bottom cover 126 through the B-PCBs 124a ad 124b are greatly reduced. Also, the reflective plate 232 absorbs part of the vibrations caused by the electric current flowing through the lamps 122, thereby reducing more of the vibrations which are transferred to the bottom cover 126 through the B-PCBs 124a and 124b.

FIG. 7 is a data sheet measuring vibrations generated in the LCD devices according to the embodiments of the present disclosure and the related art. The data described in FIG. 7 represents noise sizes (or values) (dB) measured at 5 times from the LCD devices according to the first and second embodiment of the present disclosure and the related art while a drive voltage is applied in different levels.

In a first experiment where a drive voltage having "0V" and a duty ratio of 30% is applied to the lamps, a noise value of 23.0 dB is measured from the related LCD device, while a noise value of 18.1 dB is measured from the LCD device of the first embodiment and a noise value of 17.8 dB is measured from the LCD device of the second embodiment. The LCD device of the first embodiment decreases the amount of noise by about 4.9 dB in comparison with the related art LCD device, and the LCD device of the second embodiment decreases the amount noise by about 5.2 dB in comparison with the related art LCD device.

Referring to a fifth noise data measured when a drive voltage having 0V and a duty ratio of 30% is applied to the lamps 122, the related art LCD device generates a noise of about 23.0 dB, while the LCD device of the first embodiment generates a noise of about 18.2 dB and the LCD device of the second embodiment generates a noise of about 17.1 dB. In other words, LCD device of the first embodiment reduces the amount of noise by about 4.8 dB in comparison with the related art LCD device, and the LCD device of the second embodiment reduces the amount of noise by about 5.9 dB.

In a first experiment where a drive voltage having "1.65V" and a duty ratio of 70% is applied to the lamps, a noise value of about 19.4 dB is measured from the related are LCD device, while a noise value of about 18.5 dB is measured from the LCD device of the first embodiment and a noise value of about 17.0 dB is measured from the LCD device of the second embodiment. Consequently, the LCD device of the first embodiment decreases the amount of noise by about 0.9 dB in comparison with the related art LCD device, and the LCD device of the second embodiment decreases the amount of noise by about 2.4 dB in comparison with the related art LCD device.

As seen by the fifth noise data measured when a drive voltage having 1.65V and a duty ratio of 70% is applied to the lamps 122, the related art LCD device generates a noise of about 20.7 dB, while the LCD device of the first embodiment generates a noise of about 18.8 dB and the LCD device of the second embodiment generates a noise of about 17.1 dB. In other words, the LCD device of the first embodiment reduces the amount of noise by about 1.9 dB in comparison with the related art LCD device, and the LCD device of the second embodiment reduces the amount of noise by about 3.6 dB.

These measured figures demonstrate that the LCD devices of the first and second embodiments reduce the amount of noise compared to the related art LCD device. The amount of noise is expressed by "dB" as a basic unit and calculated as Equation 1.

$$dB = 10 \log x \qquad \text{[Equation 1]}$$

In comparing noise values obtained by the equation 1, 20 dB is 10 times larger than 10 dB and 100 times larger than 1 dB. Also, 30 dB is 10 times larger than 20 dB and 1000 times larger than 1 dB. Furthermore, a sound of 100 dB is ten billion times larger than a sound of 1 dB. Actually, if the sound is enlarged from 0 dB to 1 dB, the sound size felt by the human becomes at least one time greater, or more exactly, 1.26 times greater.

As the measured figures, the LCD devices of the first and second embodiments decrease a noise of at least 0.9 dB in comparison with the related art LCD device. Therefore, the LCD devices of the first and second embodiments can minimize noise caused by the vibrations from the electric currents flowing through the lamps, unlike the relative LCD device.

As described above, the LCD devices according to an embodiment of the present disclosure include at least two insulation films or one insulation film and one reflective plate of a soundproof (or foamy) material between the bottom cover and the B-PCB. Therefore, the LCD devices can greatly reduce noise (dB) caused by the vibrations from electric currents flowing through the lamps.

Also, each insulation film included in the LCD devices according to the first and second embodiments of the present disclosure absorbs part of the vibrations caused by the electric currents flowing through the lamps, even though the distance between the plurality of lamps and the B-PCB is reduced due to the slimness of the LCD devices. As such, the LCD devices of the first and second embodiments can decrease the noise caused by vibrations.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

The invention claimed is:

1. A liquid crystal display device comprising:
    a liquid crystal panel;
    a backlight unit configured to include a plurality of lamps arranged on a rear surface of the liquid crystal panel and a plurality of optical sheets which are configured to apply lights emitted from the plurality of lamps to the liquid crystal panel;
    a bottom cover configured to receive the liquid crystal panel and the backlight unit;
    first and second balance printed circuit boards each disposed at the left and right edges of the inner side of the bottom cover and each configured to include lamp sockets receiving both ends of the plurality of lamps;
    a first insulation film;
    a second insulation film disposed between the bottom cover and the first and second balance printed circuit boards, the first insulation film disposed between the first and second balance printed circuit boards and the second insulation film,
    wherein at least two air layers are formed between the balance printed circuit boards and the second insulation film.

2. The liquid crystal display device according to claim 1, further comprising a reflective layer between the plurality of lamps and the bottom cover.

3. The liquid crystal display device according to claim 1, wherein a second air layer is formed between the second insulation layer and the bottom cover.

4. The liquid crystal display device according to claim 1, wherein the first insulation film and the second insulation film contain poly ethylene terephthalate (PET) or poly carbonate (PC).

5. The liquid crystal display device according to claim 1, wherein the first insulation film and the second insulation film comprise a soundproof material.

6. The liquid crystal display device according to claim 5, wherein the first insulation films and the second insulation film further comprise a nonflammable and nonconductive fabric.

7. The liquid crystal display device according to claim 6, wherein the first insulation film and the second insulation film further comprise a resin having an embossed pattern and are coated on the fabric.

8. A liquid crystal display device comprising:
    a liquid crystal panel;
    a backlight unit configured to include a plurality of lamps arranged on a rear surface of the liquid crystal panel and a plurality of optical sheets which are configured to apply lights emitted from the plurality of lamps to the liquid crystal panel;
    a bottom cover configured to receive the liquid crystal panel and the backlight unit;
    first and second balance printed circuit boards each disposed at the left and right edges of the inner side of the bottom cover and each configured to include lamp sockets receiving both ends of the plurality of lamps;
    a reflective plate of a soundproof material disposed on the inner side of the bottom cover and configured to reflect lights emitted from the plurality of lamps to the optical sheets; and
    an insulation film disposed between the bottom cover and the first and second balance printed circuit boards and formed opposite to the first and second balance printed circuit boards,
    wherein at least two first air layers are formed between the first and second balance printed circuit boards and the reflective plate.

9. The liquid crystal display device according to claim 8, wherein the insulation film contain poly ethylene terephthalate (PET) or poly carbonate (PC).

10. The liquid crystal display device according to claim 8, wherein the insulation film comprises a soundproof material.

11. The liquid crystal display device according to claim 9, wherein the insulation film comprises a nonflammable and nonconductive fabric disposed on the soundproof material.

12. The liquid crystal display device according to claim 8, wherein a second air layer is formed between the reflective plate and the bottom cover.

* * * * *